Jan. 7, 1964     L. ENGLHART ETAL     3,117,180

ELECTRICAL CIRCUIT WIRING

Filed Feb. 13, 1961

United States Patent Office 3,117,180
Patented Jan. 7, 1964

3,117,180
ELECTRICAL CIRCUIT WIRING
Leopold Englhart and Friedrich Sommer, Munich, Freiwald Schon, Gauting, and Willi Lohs, Friedrich Frey, and Ludwig Holler, Munich, Germany, assignors to Siemens & Halske Aktiengesellschaft, Berlin and Munich, a corporation of Germany
Filed Feb. 13, 1961, Ser. No. 88,946
Claims priority, application Germany Feb. 29, 1960
4 Claims. (Cl. 174—68.5)

This invention relates to wiring electrical circuits, especially in connection with circuits used in the communication and telephone arts, wherein the conductors or wires are held or anchored in place on a plate by means of clamping members which are pressed through holes formed in the plate. The invention is particularly concerned with a construction of the clamping member which is adapted to improve the mechanical and electrical utility of such wiring.

The plate is an insulating member on which electrical conductors are mechanically anchored, the plate functioning also as a carrier for circuit elements which are to be interconnected by the conductors or wires or being soldered to the circuit elements.

It has already been proposed to provide the plate-shaped insulating member or carrier with holes formed therein or to provide it with a desired perforated pattern, to press through the holes wires which extend thereacross, and to clamp the wires in place in the corresponding holes by means of clamping or anchoring members made in the form of small punched plate-like elements.

According to the present invention, the portions of a wire which extend across holes formed in the plate are by means of the clamping or anchoring members held in anchored positions at the level of the plate surface, the respective U-shaped clamping members straddling the wire and its legs which extend into the corresponding holes clamping fast on the plate material. The wire extends in this manner practically in a plane, even along its anchoring points, thereby avoiding, particularly in an automatic production process, damage to the wire during the anchoring operations. Moreover, the guiding of the wire true to the desired circuit is facilitated. The straddling clamping members which are inserted from above, secure the wire in simple manner against lifting off from the plate and at the same time against lateral displacement. The inserted clamping members remain accessible from the wiring side of the plate and if desired can be simply removed without affecting the corresponding holes for further use. The clamping member which can be placed in any desired angular position with its legs clamped fast on the plate material of the corresponding hole, may also be used for anchoring wires with different diameter up to a maximum thickness.

The edges of the legs of the clamping member, which is according to the invention made as a punched U-shaped part, extend perpendicularly to the axis of the intervening base portion where they bulge arcuately outwardly. Assuming a spacing between the holes on the plate such as it is provided when the previously employed small plate-like anchoring elements are used, the U-shaped clamping members will lie farther apart in a direction perpendicular to the wires since they occupy perpendicularly to the wires only small zones of the respective holes while the previously employed plate-like elements occupy the entire areas of the respective holes. The partial filling of the hole areas by the clamping or anchoring members permits, in the case of wiring on both sides of the plate, to extend through the holes conductor bridges from one to the other plate side. The edges of the legs of the respective clamping members clamp fast on the plate material along the walls of the corresponding holes, biting slightly into the material, thereby improving the anchoring of the wires. It is moreover possible to use the clamping members repeatedly since the holes are marred by the biting of the legs into the walls thereof only along small angular areas, prohibiting reinsertion of clamping members only along such marred areas. The automatic insertion of the previously known small plate-like anchoring elements made it necessary to provide holes with an accurate diameter. The structure according to the present invention permits greater tolerances with respect to the hole diameter; accordingly, the plate may be made by stamping and holes of smaller diameter can be provided, thus making it also possible to employ for the hole pattern division the division pattern which is customary in the case of printed circuits. When the legs of a blank are bent with respect to the intervening central or base portion, to form the U-shaped clamping or anchoring element, the arcuate parts of the edges extending from the base portion will be raised in bevel-like manner with respect to the plane of such base portion, thereby forming a structure which protects the wire upon the anchoring thereof while permitting sharp lateral bending of the wire at the anchoring point without danger of breaking it.

The various objects and features of the invention will now be described with reference to the accompanying drawing.

Figure 1:
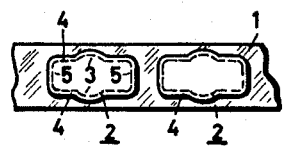
FIG. 1 shows a strip with blanks stamped therefrom which are to form clamping elements according to the invention.

Numeral 1 in FIG. 1 indicates a strip of material adapted for stamping or punching, with two blanks 2 stamped therefrom and shown in dotted lines. The blank 2 is delimited by edges 4 lying perpendicular to the axis of the central portion 3, such edges being rounded with respect to the edges of the portions 5 which are to form the legs of the clamping member.

Figure 2:
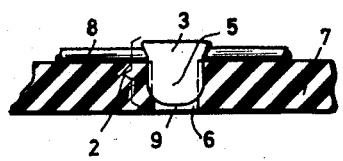
FIG. 2 illustrates in elevational side view a clamping element in wire clamping or anchoring position with the carrier or wiring plate shown in section.
Figure 3:
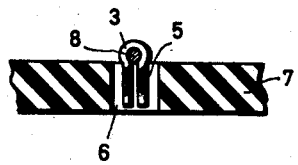
FIG. 3 is a view of the parts as seen when looking in a direction perpendicular to FIG. 2.
Figure 4:
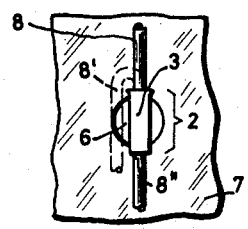
FIG. 4 shows the anchoring point of FIGS. 2 and 3 as seen from the top.

As shown in FIGS. 2 to 4, the ends of the stamped blank 2 are bent upon themselves to form a generally U-shaped structure, whereby the ends of the central or base portion 3 are slightly raised in bevel-like manner. The width of the leg portions 5 somewhat exceeds the inner diameter of a hole 6 formed in a plate 7 made of an insulating material which is adapted for stamping or drilling operations, upon which are to be anchored wires such as indicated by numeral 8. The plate is in a practical embodiment provided with a plurality of holes such as 6, which are stamped therein and arranged so that any desired circuit scheme can be realized with the use of wires such as the wire 8.

The cross-sectionally U-shaped clamping member is placed in position straddling the wire 8 and pressed into the hole 6, thereby clamping fast on the material of the plate 7, the edges of the legs 5 biting into the plate material, whereby the wire 8 is anchored on the plate. The anchoring is extraordinarily firm. The wire 8 is not bent and is not notched by the clamping member incident to the anchoring operation, being merely held in place by friction. The legs 5 are pointed or rounded at their ends 9 so as to guide the clamping member into its wire-anchoring position.

As will be seen from FIG. 4, the clamping member occupies only part of the hole 6 along a central sector thereof and it is accordingly possible to extend or thread further wires through the hole alongside of the clamping or wire-anchoring element. The spacing between two adjacent wires is not determined by the spacing between the edges of the respective openings 6 but by the spacing between the sides of the corresponding clamping members, and the wires are thus spaced apart wider.

The bevel-like displacement of the material at the ends of the central or base portion 3 of the clamping member permits sharp bending of the wire directly adjacent the anchoring point, for example, into the dash line position 8'. The wire can be cut, for example, at 8", directly adjacent the clamping member, requiring no bending or the like to secure its position.

The inner wall of the hole 6 is affected (slightly notched) only by the edges of the legs 5 of the clamping member, upon insertion thereof, and the plate can therefore be re-used for changed circuitry or the like, taking care to insert the new clamping element into the hole 6 at an angle to the position occupied by the clamping element previously used.

Changes may be made within the scope and spirit of the appended claims which define what is believed to be new and desired to have protected by Letters Patent.

We claim:

1. A wiring plate upon which electrical circuits are to be disposed, and having holes formed therein and circuit wires extending from hole to hole according to a desired wiring scheme, said circuit wires having a diameter less than the diameter of said holes and disposed to bridge the latter, wire-clamping elements of generally U-shape in transverse cross-section having leg portions of plate-like formation pressed into and bridging respective holes for anchoring said wires on the plate so that the portions of the wires which bridge across the respective holes come to lie in the plane of the corresponding side of the plate, with the central portion of each respective clamping element having a length greater than the diameter of the associated hole, with such central portion extending across such hole and overlying the associated wire, and the leg portions of each clamping element extending into the associated hole with the outer ends of said leg portions disposed therewithin and retained therein by the frictional engagement of the edges of such portions with the inner wall of such hole at opposite sides thereof.

2. A device according to claim 1, wherein the edges of the base portion of said clamping element are rounded with respect to the edges of the adjacent portions which form the legs thereof.

3. A device as defined in claim 1, wherein said clamping elements are formed from sufficiently thin material so that the combined thickness of said wire and the leg portions of the clamping element is less than the diameter of the hole.

4. A device as defined in claim 3, wherein the central portion of said clamping element overlying the wire is of a length greater than the diameter of the hole to span the same with the material at the ends of the central portion adjacent the leg portion having a bevel-like configuration.

References Cited in the file of this patent

UNITED STATES PATENTS

| | | |
|---|---|---|
| 429,943 | McGill | June 10, 1890 |
| 1,855,471 | Buchanan | Apr. 26, 1932 |
| 1,965,882 | Cook | July 10, 1934 |
| 2,551,970 | Sampson | May 8, 1954 |

FOREIGN PATENTS

| | | |
|---|---|---|
| 636,007 | Great Britain | Apr. 19, 1950 |